United States Patent
Roberts

(10) Patent No.: US 9,811,456 B2
(45) Date of Patent: Nov. 7, 2017

(54) RELIABLE WEAR-LEVELING FOR NON-VOLATILE MEMORY AND METHOD THEREFOR

(71) Applicant: Advanced Micro Devices, Inc., Sunnyvale, CA (US)

(72) Inventor: David A. Roberts, Santa Cruz, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 53 days.

(21) Appl. No.: 14/554,972

(22) Filed: Nov. 26, 2014

(65) Prior Publication Data

US 2016/0147467 A1 May 26, 2016

(51) Int. Cl.
*G06F 12/02* (2006.01)

(52) U.S. Cl.
CPC .. *G06F 12/0238* (2013.01); *G06F 2212/7211* (2013.01)

(58) Field of Classification Search
CPC ..... G06F 2212/7201; G06F 2212/7211; G06F 12/0238
USPC ........................................................ 711/103
See application file for complete search history.

(56) References Cited

U.S. PATENT DOCUMENTS

| 4,742,482 A * | 5/1988 | Inskeep | H04M 11/06 365/228 |
|---|---|---|---|
| 7,076,599 B2 * | 7/2006 | Aasheim | G06F 3/0619 711/103 |
| 8,856,438 B1 * | 10/2014 | Warner | G06F 3/0638 711/112 |
| 2003/0163594 A1 * | 8/2003 | Aasheim | G06F 3/0619 719/310 |
| 2004/0172501 A1 * | 9/2004 | Ukai | G06F 3/0605 711/112 |
| 2010/0082550 A1 * | 4/2010 | Cong | G06F 11/1435 707/672 |

(Continued)

OTHER PUBLICATIONS

Zbarsky, Vladmir, "Adding wear-levelling (and potentially atomic journaling) support for metadata on FAT12/FAT16/FAT32 file system, targetting flash memory storage devices," IP.com, Oct. 2008.*

(Continued)

*Primary Examiner* — Reginald Bragdon
*Assistant Examiner* — Aaron D Ho
(74) *Attorney, Agent, or Firm* — Polansky & Associates, P.L.L.C.; Paul J. Polansky

(57) ABSTRACT

In one form, a data processor comprises a memory accessing agent and a memory controller. The memory accessing agent selectively initiates read accesses to and write accesses from a memory. The memory controller is coupled to the memory accessing agent and is adapted to be coupled to the memory and to access the memory using a start-gap wear-leveling algorithm. The memory controller is adapted to maintain a metadata log in a region of the memory and to store in the metadata log a start address and a gap address used in the start-gap wear-leveling algorithm, and upon initialization to access the metadata log to retrieve an initial start address and an initial gap address for use in the start-gap wear-leveling algorithm. In another form, a memory module may comprise a memory buffer including such a memory controller.

17 Claims, 5 Drawing Sheets

(56) References Cited

U.S. PATENT DOCUMENTS

| | | | |
|---|---|---|---|
| 2010/0082919 A1* | 4/2010 | Chen | G06F 3/0613 711/161 |
| 2010/0281202 A1* | 11/2010 | Abali | G06F 12/0246 711/103 |
| 2011/0302474 A1* | 12/2011 | Goss | G06F 11/1004 714/758 |
| 2013/0124793 A1* | 5/2013 | Gyl | G06F 12/0246 711/103 |
| 2015/0193339 A1* | 7/2015 | Kim | G06F 12/0246 711/103 |

OTHER PUBLICATIONS

Y. Park and K. H. Park, "High-Performance Scalable Flash File System Using Virtual Metadata Storage with Phase-Change RAM," in IEEE Transactions on Computers, vol. 60, No. 3, pp. 321-334, Mar. 2011.*

Smith, S., "The Scientist and Engineer's Guide to Digital Signal Processing—Chapter 28: Digital Signal Processors", retrieved Mar. 29, 2013 via the WayBack Machine, <https://web.archive.org/web/20130329051201/http://www.dspguide.com/ch28/2.htm>.*

N. H. Seong, D. H. Woo and H.S. Lee, "Security Refresh: Prevent Malicious Wear-out and Increase Durability for Phase-Change Memory with Dynamically Randomized Address Mapping," Proceedings of the International Symposium on Computer Architecture, Jun. 2010, ACM 978-1-4503-0053-7/10/06, 12 pages.

A. Seznec, "A Phase Change Memory as a Secure Main Memory," IEEE Computer Architecture Letters, vol. 7, 2008, DOI 10.1109/L-CA.2010.2, 4 pages.

M. K. Qureshi, M. Franchescini, V. Srinivasan, L. Lastras, B. Abali and J. Karidis, "Enhancing Lifetime and Security of PCM-Based Main Memory with Start-Gap Wear Leveling," Proceedings of the 42nd Annual IEEE/ACM International Symposium on Microarchitecture, Dec. 2009, ACM 978-1-60558-798-1/09/12, 10 pages.

* cited by examiner

400

500

RELIABLE WEAR-LEVELING FOR NON-VOLATILE MEMORY AND METHOD THEREFOR

FIELD

This disclosure relates generally to memory controllers, and more specifically to memory controllers that remap memory locations for wear-leveling purposes.

BACKGROUND

For many years, computer main memory has been dominated by dynamic random access memory (DRAM) because of its high density, fast access time, and low cost. However DRAM is volatile and loses its contents when power is removed. DRAM's volatility has required computer users to wait for several minutes every time the computer starts up while the basic input-output system (BIOS) and operating system load information from a slower computer disk and set up the DRAM memory for normal program execution.

Floating-gate non-volatile memory is another memory technology that has low cost and high density. Some computers today use solid-state drives based on floating-gate non-volatile memory to store the operating system and therefore allow very fast startup. However floating-gate non-volatile memory suffers from long write times and cannot replace all the DRAM in the system.

In recent years, new types of non-volatile memory have been developed. These new memory types include phase change memory (PCM), magneto-resistive random access memory (MRAM), ferro-electric random access memory (FeRAM), and resistive random access memory (RRAM). These new memory types have significantly faster access times, and specifically write times, than floating-gate non-volatile memory. Thus they appear to be more promising replacements for DRAM as main computer memory.

However these newer memory technologies wear out after a certain number of write cycles, which can necessitate their replacement in as little as two years or less. Frequent replacement is expensive and disruptive to the user. Moreover certain operating systems and computer programs cause memory locations to be accessed non-uniformly, which could limit the lifetime of PCM and other similar emerging memory technologies to the lifetime of the most frequently used memory locations.

Figure 1:
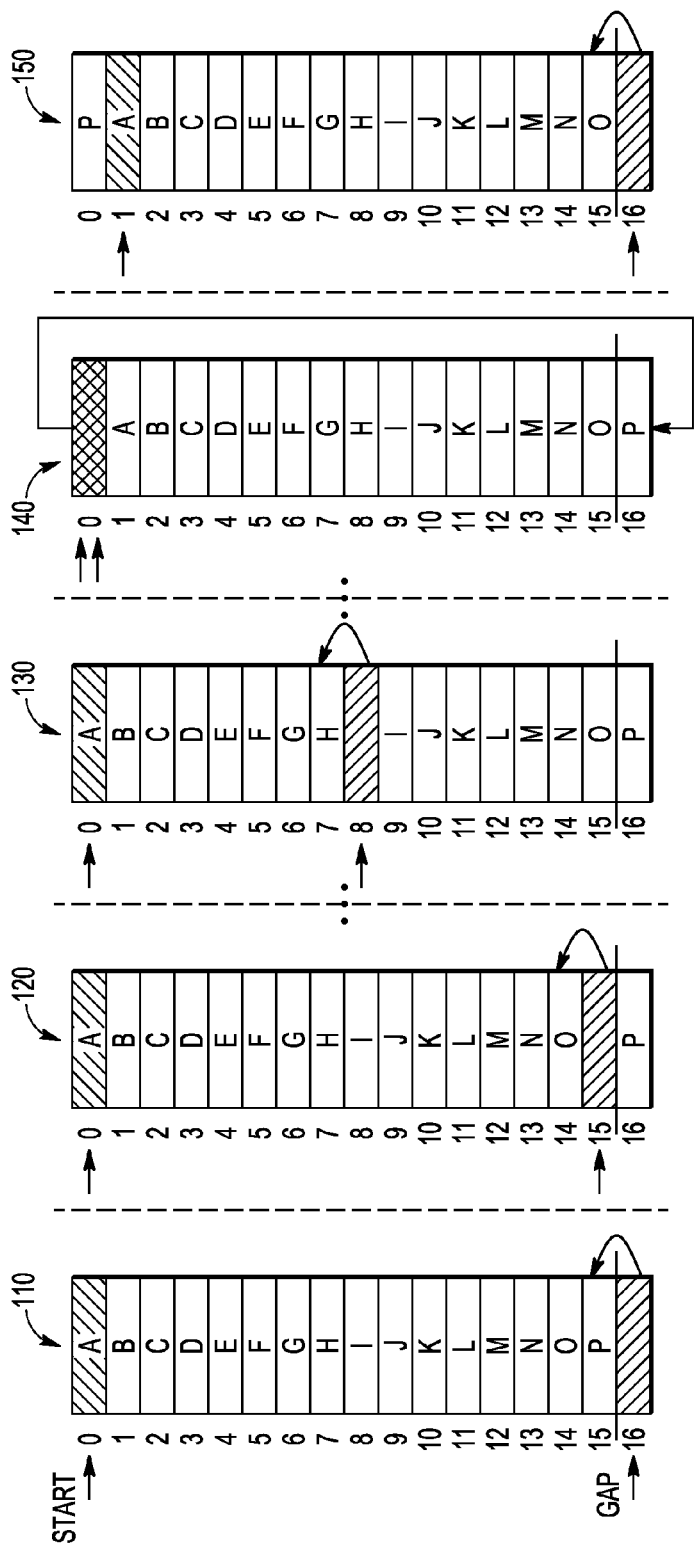
FIG. 1 illustrates in block diagram form a set of memory maps describing the operation of a wear leveling technique known in the prior art.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

In some embodiments, a data processor includes a memory accessing agent and a memory controller. The memory accessing agent selectively initiates read accesses from and write accesses to a memory. The memory can be byte-addressable write-limited memory such as phase change memory (PCM), magneto-resistive random access memory (MRAM), ferro-electric random access memory (FeRAM), resistive random access memory (RRAM), and the like. The memory controller is coupled to the memory accessing agent and is adapted to be coupled to the memory and to access the memory using a start-gap wear-leveling algorithm. The memory controller is adapted to maintain a metadata log in a region of the memory and to store in the metadata log a start address and a gap address used in the start-gap wear-leveling algorithm, and upon initialization to access the metadata log to retrieve an initial start address and an initial gap address for use in the start-gap wear-leveling algorithm.

In some embodiments, a memory module may comprise an interface, a memory, and a memory buffer. The memory defines a memory space for storing data in response to write accesses and retrieving data in response to read accesses. The memory buffer is coupled between the interface and the memory and includes a memory controller that remaps accesses to the memory using a start-gap wear-leveling algorithm. The memory controller is adapted to maintain a metadata log in a region of the memory space and to store in the metadata log a start address and a gap address used in the start-gap wear-leveling algorithm, and to access the metadata log on initialization to retrieve an initial start address and an initial gap address for use in the start-gap wear-leveling algorithm. For example in some embodiments, the memory module may implement the memory using a set of memory chips and the memory buffer using a separate chip. In other embodiments, the memory module may implement the memory using a set of memory chips in which each memory chip includes its own memory buffer.

In some embodiments, a method is used to implement wear-leveling. Read accesses to and write accesses from a memory are selectively received. The read accesses and write accesses are remapped using a start-gap wear-leveling algorithm. A metadata log is maintained in a region of the memory. A start address and a gap address used in a start-gap wear-leveling algorithm are stored in the metadata log. The metadata log is accessed on initialization to retrieve an initial start address and an initial gap size for use in the start-gap wear-leveling algorithm FIG. 1 illustrates in block diagram form a set of memory maps 100 describing the operation of a wear leveling technique known in the prior art. This wear-leveling technique is known as the "Start-Gap" algorithm and was described by Quereshi et al. in a paper entitled "Enhancing Lifetime and Security of PCM-Based Main Memory with Start-Gap Wear Leveling," 42$^{nd}$ Annual IEEE/ACM International Symposium on Microarchitecture, 2009, pages 14-23. Memory maps 100 include individual memory maps 110, 120, 130, 140, and 150 shown at different points in the operation of the start-gap algorithm. Each memory map includes a set of seventeen memory locations 0-16 which maintain a set of sixteen data elements labeled "A" through "P". At the beginning of the operation of the start-gap algorithm, all sixteen data elements are stored in consecutive locations starting from location 0 which is designated the "START" location, and extending through location 15. Location 16 is unused and is designated as the "GAP" location. START points to logical address 0, and GAP points to a location that has no data stored in it, and is skipped over. Thus at this iteration locations 0-15 are written while location 16 is not. At a subsequent point in time corresponding to memory map 120, the GAP location rotates to location 15, and thus elements A through O are stored in locations 0-14, respectively, element P is stored in location 16, and location 15 becomes the new GAP location. Over time the GAP location travels or rotates to successively lower addresses between iterations. FIG. 1 shows an intermediate memory map 130 in which the GAP location has rotated to memory location 8, and thus memory locations 0-7 store elements A through H, respectively, and memory locations 9-16 store memory elements I through P, respectively. In a further intermediate memory map 140, the GAP location has rotated all the way to memory location 0, and memory locations 1 through 16 store memory elements A through P, respectively. At the next iteration of the start-gap algorithm, the GAP location wraps around to location 16 and the START location increments by one to location 1 as shown in memory map 150. Note that memory location 0 now stores element P, and memory locations 1 through 15 store elements A through O, respectively. Thus the data elements themselves rotate through all different memory locations so that frequently written data elements are also rotated through all the memory locations and the memory is effectively wear leveled.

Figure 2:
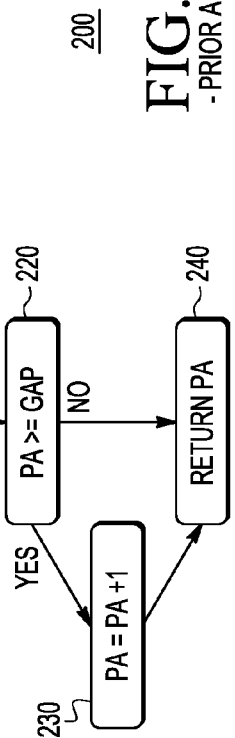
FIG. 2 illustrates a flow diagram associated with the wear-leveling technique of FIG. 1.

FIG. 2 illustrates a flow diagram 200 associated with the wear-leveling technique of FIG. 1. Flow starts at action box 210, which calculates the physical address PA by adding the logical address LA to the start address START, modulo N, where N is the number of address locations in the memory. Note that as used here, LA is the logical address from the standpoint of the memory controller; an address generated by a program which is conventionally referred to as the virtual address may have already undergone an address translation process that converts it into a physical address as part of conventional demand paging memory management. In this case, the physical address output from the memory management unit becomes the logical address that is input to a wear-leveling memory controller.

At decision box 220, the PA is compared to the GAP to determine if the PA is greater than or equal to the GAP. If so, then flow proceeds to action box 230 in which the physical address is incremented, in other words PA=PA+1, and flow proceeds to action box 240. If not, flow proceeds directly to action box 240. In action box 240, the PA is returned to other circuitry in the memory controller for completion of the access. Thus the start-gap algorithm only requires registers to store the values of START, GAP, and N and only requires a small amount of control logic.

Quereshi's algorithm provides an effective mechanism for uniform wear-leveling. However it stores the START and GAP values in volatile registers. These values should be stored correctly and persistently to prevent data corruption. Unfortunately, the START and GAP values will be lost in the event of unexpected power loss in which the operating system cannot store them before loss of power, which limits the algorithm's reliability.

Figure 3:
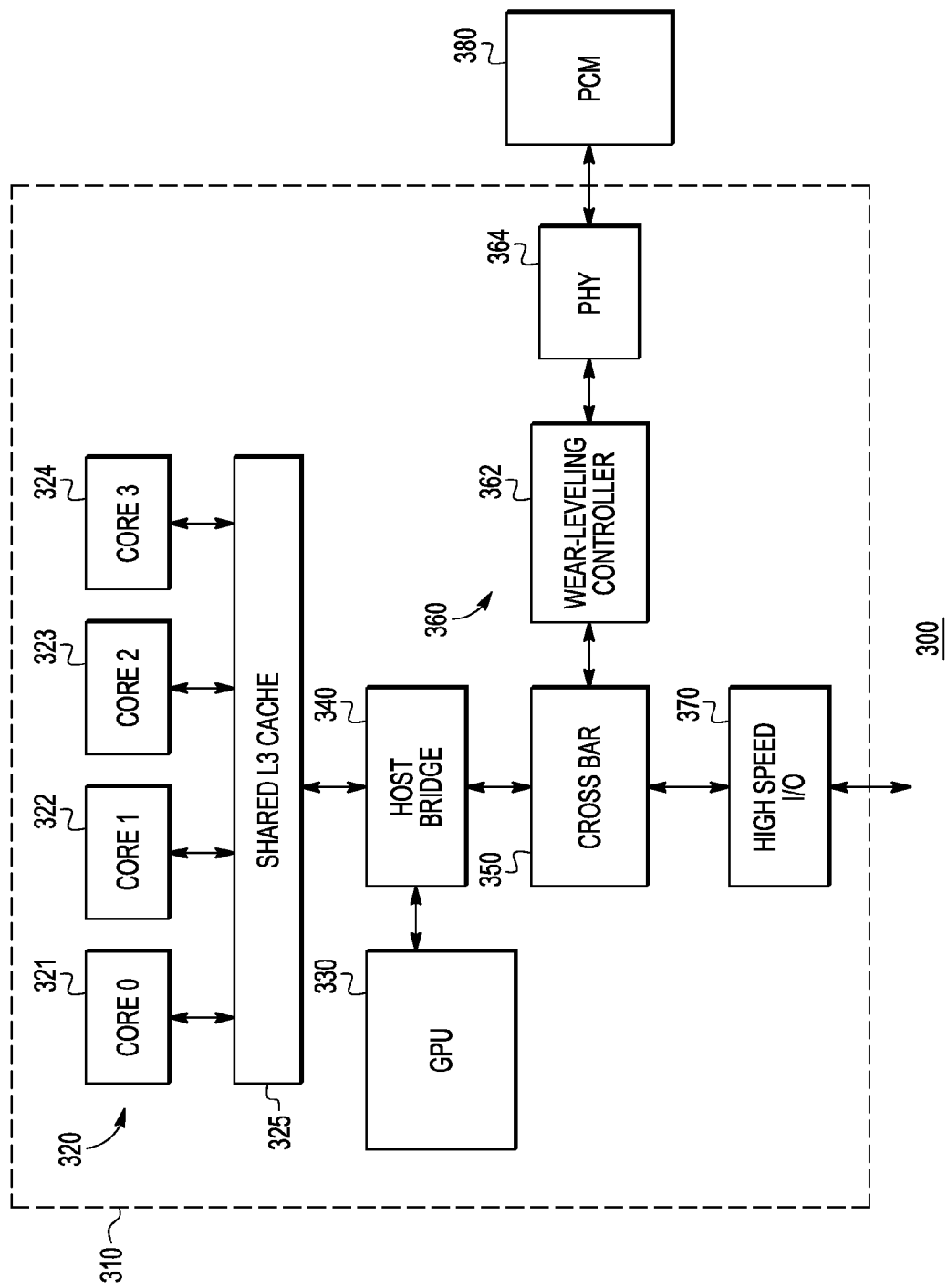
FIG. 3 illustrates in block diagram form an exemplary data processing system with wear-leveling according to some embodiments.

FIG. 3 illustrates in block diagram form an exemplary data processing system 300 with wear-leveling according to some embodiments. Data processing system 300 includes generally an integrated circuit data processor 310 and a separate main memory that is susceptible to wear-out, such as a phase change memory (PCM) 380 used in data processing system 300.

Integrated circuit data processor 310 is an accelerated processing unit (APU) that includes a central processing unit portion 320 and a graphics processing unit 330, interconnected to each other through a host bridge 340 and to other system components using a crossbar 350. Central processing unit portion 320 includes a set of four central processing unit cores 321-324 each having internal L1 and L2 caches but having a shared L3 cache 325. Central processing unit portion 320 initiates accesses to and from other system components through shared L3 cache 325 which is bidirectionally connected to host bridge 340. Likewise GPU 330 is bidirectionally connected to host bridge 340 and initiates read and write accesses to memory and peripherals using host bridge 340.

Crossbar 350 is used to route accesses between system components and is bidirectionally connected to a memory controller 360 and a high-speed input/output controller 370. Crossbar 350 supports a variety of connections such as CPU core to main memory, GPU to main memory, an external accessing agent through high-speed I/O controller 370 to main memory, etc.

Memory controller 360 includes a wear-leveling controller 362 and a physical interface (PHY) 364. Wear-leveling controller 362 implements some of the high level control functions associated with memory controller 360 such as access decoding, buffering, re-ordering, and the like. In data processing system 300 shown in FIG. 3, wear-leveling controller 362 is adapted to interface to PCM 380. For example, wear leveling controller 362 may be adapted to interface to PCM 380 by being designed specifically to interface to PCM 380. In another form, wear-leveling controller 362 may be adapted to interface to PCM 380 by being software programmable to allow the BIOS or the operating system to program it to interface to PCM 380, while also being programmable to interface to other types of byte-addressable non-volatile memory that are susceptible to wear-out, such as MRAM, FeRAM, RRAM, and the like.

High-speed I/O controller 370 includes logic to translate internal accesses to the protocol of an external high-speed I/O bus and vice versa. In one example, high-speed I/O controller 370 implements the Peripheral Component Interconnect Express (PCIE) protocol, and high-speed I/O controller 370 implements a PCIE root complex. However PCIE is merely one example of the types of I/O interface protocols that may be used.

In operation, each of CPU cores 321-324, GPU 330, and high-speed I/O controller 370 operates as a memory accessing agent for initiating read and write accesses to PCM 380. Wear-leveling controller 362 ensures that the memory locations of PCM 380 are rotated evenly using the start-gap wear-leveling algorithm. However wear leveling controller 362 maintains a data structure in PCM 380 referred to as a metadata log to keep track of the START and GAP parameters. Thus in the case of an unexpected power loss, these values are persistent and can be retrieved from PCM 380 so that the start-gap wear-leveling algorithm can properly resume after unexpected system power loss. Moreover the metadata log itself is a wear-leveled circular buffer that can be sized to wear out at the same rate as the rest of PCM 380.

It should be apparent that data processing system 300 is just one example of a system in which various memory accessing agents access memory that is susceptible to wear-out, and many other types and combinations of accessing agents are possible.

Figure 4:
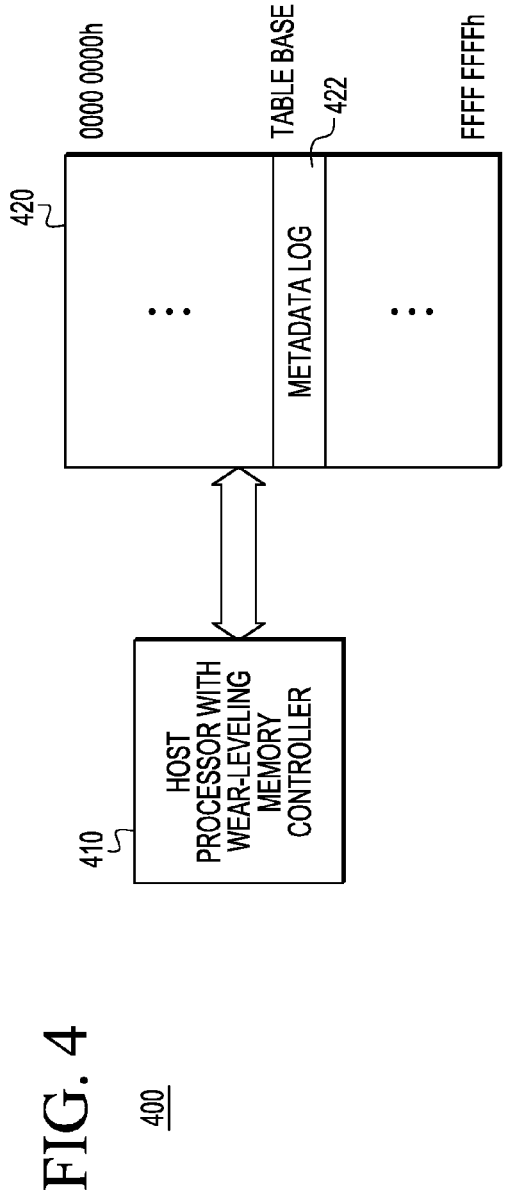
FIG. 4 illustrates in block diagram form a data processing system that implements wear-leveling according to some embodiments.

FIG. 4 illustrates in block diagram form a data processing system 400 that implements wear-leveling according to some embodiments. Data processing system 400 includes generally a host processor 410 with a wear-leveling memory controller (such as integrated circuit data processor 310 of FIG. 3) and a memory 420 that is a byte-addressable memory subject to wear out (such as PCM 380 of FIG. 3). As shown in FIG. 4, data processing system 400 places a metadata log 422 in a location in memory 420 that is fixed or predetermined, and the address range reserved for metadata log 422 is excluded from the set of target physical addresses used in the start-gap algorithm. The starting address of metadata log 422 is indicated by an address labeled "TABLE BASE". Host processor 410 accesses metadata log 422 as a circular buffer using the TABLE BASE address as a starting address, and the memory locations used for metadata log 422 are unavailable to host processor 410 for other purposes. On system restart and power up, host processor 410 accesses metadata log 422 to fetch the START and GAP addresses to provide seamless operation of the start-gap wear-leveling algorithm even after unexpected power interruptions.

Figure 5:
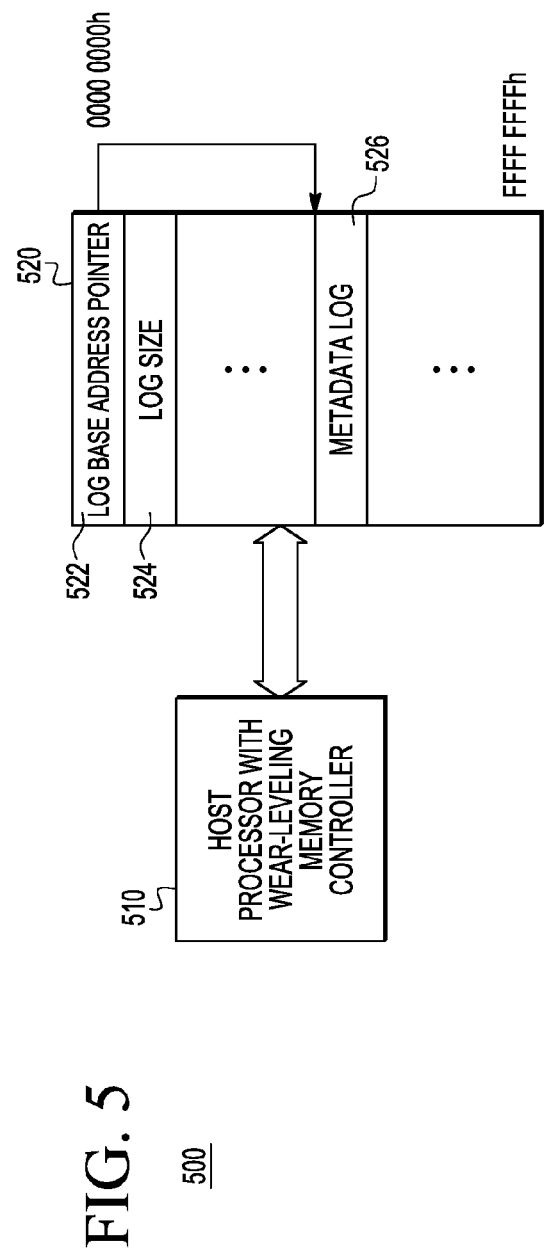
FIG. 5 illustrates in block diagram form another data processing system that implements wear-leveling according to some embodiments.

FIG. 5 illustrates in block diagram form another data processing system 500 that implements wear-leveling according to some embodiments. Data processing system 500 includes generally a host processor 510 with a wear-leveling memory controller (such as integrated circuit data processor 310 of FIG. 3) and a memory 520 that is a byte-addressable memory subject to wear out (such as PCM 380 of FIG. 3). As shown in FIG. 5, data processing system 500 places a metadata log 526 in a location in memory 520 indicated by a value labeled "LOG BASE ADDRESS POINTER" stored in a fixed location 522 in memory 520. In this example, fixed location 522 is at the beginning of the address space at address 0000 0000 hexadecimal (or 0000 0000h). The size of metadata log 526 is labeled "LOG SIZE" and is stored in a successive memory location 524. The address range reserved for metadata log 526 is excluded from the set of target physical addresses used in the start-gap algorithm. The use of the LOG BASE ADDRESS POINTER and the LOG SIZE allows metadata log 526 to be placed at a convenient location the memory space. For example, metadata log 526 can be placed in an area storing other initialization parameters to avoid unnecessarily creating a "hole" in the memory map.

Figure 6:
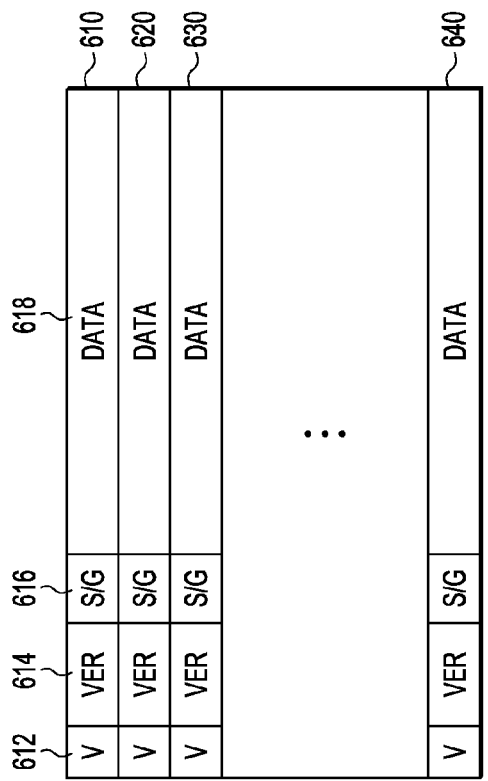
FIG. 6 illustrates a diagram showing the structure of a metadata log that can be used as the metadata log of FIG. 4 or FIG. 5.

FIG. 6 illustrates a diagram showing the structure of a metadata log 600 that can be used as metadata log 422 of FIG. 4 or metadata log 526 of FIG. 5. Metadata log 600 includes a series of entries and FIG. 6 illustrates a representative set including a first entry 610, a second entry 620, a third entry 630, and a last entry 640. First entry 610 includes a valid bit 612 labeled "V", a version field 614 labeled "VER", an optional start/gap field 616 labeled "S/G", and a data field labeled "DATA" 618. Valid bit 612 indicates whether a particular entry is valid. Version field 614 is used by the memory controller to indicate which entry or entries in metadata log 600 store the most recent START and GAP addresses. In the example shown in FIG. 6, the S/G bit indicates whether the entry contains a START address or a GAP address in the corresponding DATA field. In this embodiment, each update of the START and GAP addresses would be indicated by a higher version number, with one entry used for the START address and another entry used for the GAP address. In an alternate embodiment, each entry could store both the START and the GAP addresses for each iteration of the start-gap algorithm.

Figure 8:
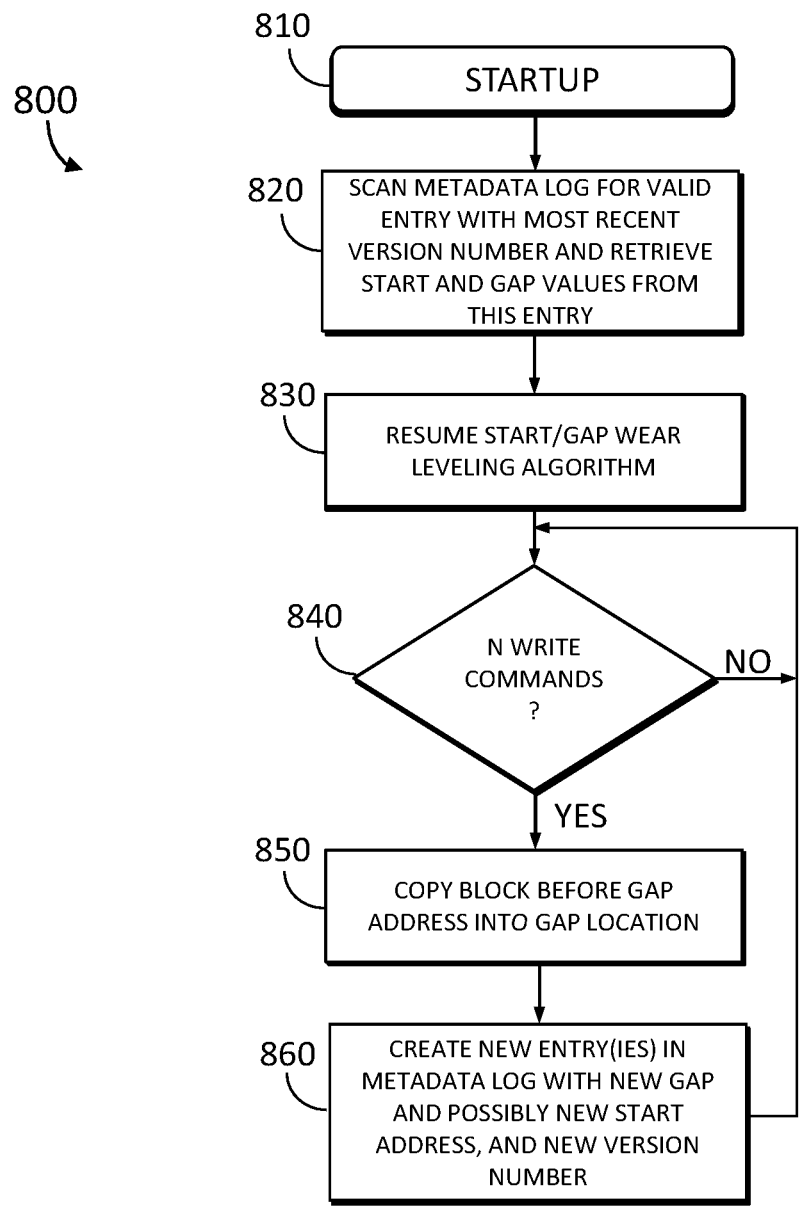
FIG. 8 is a flow diagram illustrating the retrieval of the initial start/gap addresses upon system initialization.

Startup is now explained with reference to FIG. 6 and FIG. 8, which illustrates a flow diagram 800 illustrating the retrieval of the initial start/gap addresses upon system initialization. On startup (810), the memory controller scans metadata log 600 to find the valid START and GAP addresses with the most recent version number (820). The most recent version could be indicated by the highest version number of a set of consecutive version numbers starting with the lowest version number present. By continuously saving the current parameters including the version number in metadata log 600, which itself is in non-volatile memory, metadata log 600 ensures the reliability of the wear-leveling algorithm.

After the START and GAP parameters are retrieved from metadata log 600, the start/gap wear leveling algorithm is resumed (830). Every N write commands (840), the memory controller increments the GAP address, and might change the START address. On this occurrence, the block before the GAP address is copied into the GAP location (850), but the data visible to the host remains unchanged. Next the GAP and possibly the START registers are changed and a new entry for the START and/or GAP values is appended to the metadata log with a new version number (860).

If both the START and GAP registers are modified, the update is made in a way to ensure consistency such that both registers are updated or neither is updated. There are several ways to ensure consistency of the updates when the START and GAP registers are both modified together. For example, the memory controller could always write both the START and GAP values in a single instruction. An atomic write feature offered by the memory controller or the memory device could also be used. In some embodiments, the memory controller writes the version number of the corresponding START address entry with the GAP address entry, or the version of the GAP address entry with the START address entry. On power up if no valid, matching pair of entries exists in metadata log 600 for the most recent version number, then the matching pair of START and GAP entries with the previous version number would be used.

The memory controller also updates the metadata log before any new write accesses are performed in the data area. If the version numbers roll over, all but the latest version numbers could be invalidated with a succession of versions again starting from zero.

Because metadata log 600 is a circular buffer, it is also automatically wear-leveled. Moreover the size of metadata log 600 can be chosen to match the wear-out rate of the main data area. For example, if a new log entry is made every 100 write cycles, metadata log 600 could have a number of entries equal to $\frac{1}{100}^{th}$ of the number of data blocks of the data region. In some embodiments, the metadata log can store other important metadata besides wear-leveling metadata. In addition, extra error protection could be applied to the metadata log. Also metadata log 600 could be implemented with single-level cells instead of multi-level cells (for byte-addressable non-volatile memory with multi-level cells) to ensure reliability. Note that the contents of metadata log 600 or the start and gap register values can be cached in volatile memory as long as there is enough energy in the system and appropriate shut down procedures to ensure storage of the data in non-volatile memory in the event of power loss.

Figure 7:
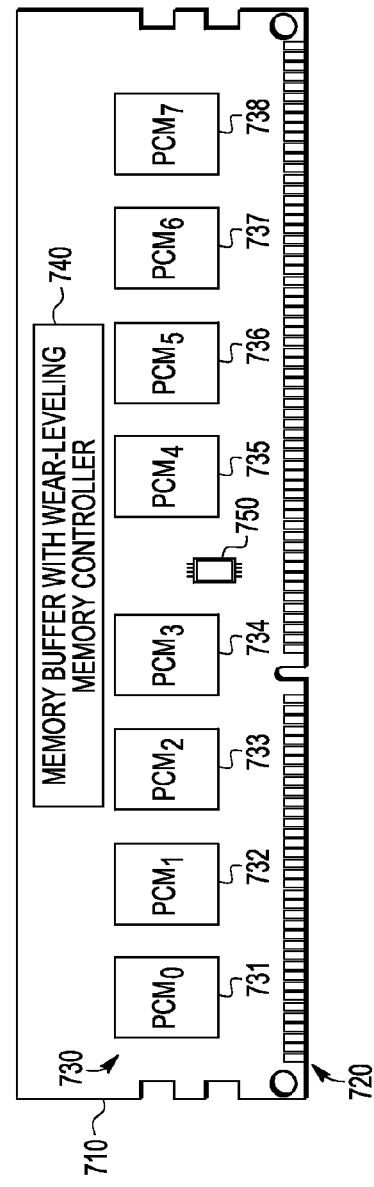
FIG. 7 illustrates a side view of a memory module with wear-leveling according to some embodiments.

FIG. 7 illustrates a side view of a memory module 700 with wear-leveling according to some embodiments. Memory module 700 includes generally a substrate 710 having a physical interface 720 at an edge thereof, a memory 730, a memory buffer 740, and a serial presence detect (SPD) non-volatile memory 750. Substrate 710 along with physical interface 720 can be designed according to any of a variety of standard formats such as an unbuffered dual inline memory module (DIMM), a fully-buffered DIMM, a registered DIMM, and the like. Memory 730 includes a set of eight memory chips 731-738 implemented on a first side of memory module 700 and arranged in a side-by-side fashion. In the embodiment shown in FIG. 7, memory chips 731-738 are PCM chips and are labeled $PCM_0$-$PCM_7$, respectively. Memory buffer 740 includes a wear-leveling controller that operates in the same manner as wear-leveling controller 362 and thus performs all wear leveling on memory module 700. SPD non-volatile memory 750 includes a variety of information about the characteristics of memory 730, such as type, access time, manufacturer, and the like, and can be read by the BIOS on system startup.

Memory module 700 implements wear-leveling using a memory controller on the memory module itself. Thus memory module 700 makes the wear-leveling remapping invisible to the host processor, eliminating the need for the data processor to implement multiple memory controller types or universal memory controllers that can be programmed to control a variety of different types of memories.

As is well known, memory module 700 can include memory similar to memory 730 on a reverse side thereof and thus provide twice the capacity. Note that while memory module 700 includes a memory buffer 740 having a wear-leveling controller that is shared among memory chips 731-738, each memory chip could include its own dedicated wear-leveling controller, eliminating the need for memory buffer 740. Moreover while memory module 700 was illustrated in the context of PCM, it may use other types of non-volatile memory that are subject to wear out. For example the wear-leveling memory controller may be incorporated into existing memory modules that are designed as RAM replacements and that include conventional NOR or NAND FLASH memory.

Thus, a data processor as described above can include a memory accessing agent and a memory controller designed to ensure uniform wear-out of a byte-addressable non-volatile memory that is subject to wear-out after a large number of write cycles. The memory controller implements the start-gap wear-leveling algorithm by maintaining a metadata log in a region of the memory and to store in the metadata log a start address and a gap address used in the start-gap wear-leveling algorithm. Upon initialization the memory controller accesses the metadata log to retrieve an initial start address and an initial gap address for use in the start-gap wear-leveling algorithm and thus ensures the reliability of the start-gap algorithm after unexpected system power loss. The memory controller can size the metadata log so that it wears out at the same rate as the rest of the memory. In some embodiments, the memory controller can be moved to a memory module or even to the memory chips themselves and thus the wear-leveling can remain invisible to the processor.

The functions of memory controller 360 of FIG. 3 may be implemented with various combinations of hardware and software. For example, some wear-leveling calculations associated with the start-gap algorithm may be performed by firmware programmed into integrated circuit data processor 310 and running on a general purpose or dedicated data processor core. Thus some of the software components may be stored in a non-transitory computer readable storage medium for execution by at least one processor. For example, the firmware may be hard coded in integrated circuit data processor 310, or may stored in BIOS ROM. In various embodiments, the non-transitory computer readable storage medium could include a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, the circuits of FIGS. 3-5 and 7 or portions thereof may be described or represented by a computer accessible data structure in the form of a database or other data structure which can be read by a program and used, directly or indirectly, to fabricate integrated circuits with the circuits of 3-5 and 7. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates that also represent the functionality of the hardware comprising integrated circuits with the circuits of FIGS. 3-5 and 7. The netlist may then be placed and routed to produce a data set describing geometric shapes to be applied to masks. The masks may then be used in various semiconductor fabrication steps to produce integrated circuits of FIGS. 3-5 and 7. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, the memory controller can interface to a variety of non-volatile memory that is subject to wear-out, including byte-addressable write-limited memory such as phase change memory (PCM), magneto-resistive random access memory (MRAM), ferro-electric random access memory (FeRAM), resistive random access memory (RRAM), and the like. Moreover while FIG. 3 illustrates an APU that includes several memory accessing agents in the form of CPU cores, a GPU, and an I/O controller, other types of memory accessing agents are possible such as digital signal processors (DSPs), network processors, peripheral controllers, and the like, and a data processor can have a variety of types and numbers of such memory accessing agents. The metadata log can be stored at a predetermined location in the memory space, or can be mapped to a convenient portion of the memory space using base address and size registers.

Accordingly, it is intended by the appended claims to cover all modifications of the disclosed embodiments that fall within the scope of the disclosed embodiments.

What is claimed is:

1. A data processor comprising:
    a memory accessing agent for initiating read accesses to and write accesses from a memory defining a memory space; and a memory controller coupled to said memory accessing agent and adapted to be coupled to said memory and to access said memory using a start-gap wear-leveling algorithm, wherein said memory controller is adapted to maintain a metadata log in a location of said memory using a log base address pointer stored in a first predetermined location of said memory and a log size stored in a second predetermined location of said memory, wherein said log base address pointer maps said metadata log to a portion of said memory space, and to store in said metadata log a start address and a gap address used in said start-gap wear-leveling algorithm, and upon initialization to access said metadata log to retrieve an initial start address and an initial gap address for use in said start-gap wear-leveling algorithm.

2. The data processor of claim 1 wherein said metadata log comprises a plurality of entries, each entry comprising a valid bit, a version number, and data indicating at least one of said start address and said gap address.

3. The data processor of claim 2 wherein upon initialization, said memory controller scans said metadata log to locate a valid entry with a most recent version number.

4. The data processor of claim 1 wherein said memory controller maintains said metadata log as a circular buffer and continuously saves current parameters in said metadata log, said continuously saving including updating said metadata log by adding a new entry when updating said start address as part of said start-gap wear-leveling algorithm.

5. The data processor of claim 4 wherein when adding said new entry said memory controller stores said start address and said gap address in said metadata log using an indivisible operation.

6. The data processor of claim 1 wherein said memory comprises a byte-addressable non-volatile memory.

7. A memory module comprising:
an interface;
a memory defining a memory space for storing data in response to write accesses and retrieving data in response to read accesses, said memory being write-limited; and
a memory buffer coupled between said interface and said memory and including a memory controller that remaps accesses to said memory using a start-gap wear-leveling algorithm,
wherein said memory controller is adapted to maintain a metadata log in a location of said memory space using a log base address pointer stored in a first predetermined location of said memory and a log size stored in a second predetermined location of said memory, wherein said log base address pointer maps said metadata log to a portion of said memory space, and to store in said metadata log a start address and a gap address used in said start-gap wear-leveling algorithm, and to access said metadata log on initialization to retrieve an initial start address and an initial gap address for use in said start-gap wear-leveling algorithm.

8. The memory module of claim 7 wherein said metadata log comprises a plurality of entries, each entry comprising a valid bit, a version number, and data indicating at least one of said start address and said gap address.

9. The memory module of claim 8 wherein upon initialization, said memory controller scans said metadata log to locate a valid entry with a most recent version number.

10. The memory module of claim 8 wherein said memory controller maintains said metadata log as a circular buffer and continuously saves current parameters in said metadata log, said continuously saving including updating said metadata log by adding a new entry when updating said start address as part of said start-gap wear-leveling algorithm.

11. The memory module of claim 7 wherein said memory comprises a phase change memory.

12. A method comprising:
receiving read accesses to and write accesses from a memory defining a memory space;
remapping said read accesses and said write accesses using a start-gap wear-leveling algorithm;
maintaining a metadata log in a location of said memory using a log base address pointer stored in a first predetermined location of said memory and a log size stored in a second predetermined location of said memory, wherein said log base address pointer maps said metadata log to a portion of said memory space;
storing in said metadata log a start address and a gap address used in said start-gap wear-leveling algorithm; and
accessing said metadata log on initialization to retrieve an initial start address and an initial gap address for use in said start-gap wear-leveling algorithm.

13. The method of claim 12 wherein said maintaining comprises:
operating said metadata log as a circular buffer comprising a plurality of entries, each entry comprising a valid bit, a version field, and data indicating at least one of said start address and said gap address.

14. The method of claim 13 wherein said accessing comprises scanning said metadata log to locate a valid entry with a highest version number.

15. The method of claim 12 wherein said storing comprises storing said start address and said gap address in said metadata log using an indivisible operation.

16. The method of claim 12 further comprising continuously saving current parameters in said metadata log.

17. The method of claim 16 wherein said continuously saving current parameters comprises updating said metadata log by adding a new entry when updating said start address as part of said start-gap wear-leveling algorithm.

* * * * *